US012657905B2

(12) United States Patent
Chaurasia et al.

(10) Patent No.: US 12,657,905 B2
(45) Date of Patent: Jun. 16, 2026

(54) SYSTEM FOR PROVIDING ENHANCED VISION TRANSFORMER BLOCKS FOR COMPUTER VISION

(71) Applicant: Micron Technology, Inc., Boise, ID (US)

(72) Inventors: Abhishek Chaurasia, Redmond, WA (US); Shakti Nagnath Wadekar, West Lafayette, IN (US)

(73) Assignee: Micron Technology, Inc., Boise, ID (US)

( * ) Notice: Subject to any disclaimer, the term of this patent is extended or adjusted under 35 U.S.C. 154(b) by 238 days.

(21) Appl. No.: 18/359,786

(22) Filed: Jul. 26, 2023

(65) Prior Publication Data

US 2024/0037931 A1     Feb. 1, 2024

Related U.S. Application Data

(60) Provisional application No. 63/393,751, filed on Jul. 29, 2022.

(51) Int. Cl.
| | |
|---|---|
| *G06V 10/96* | (2022.01) |
| *G06T 7/11* | (2017.01) |
| *G06V 10/764* | (2022.01) |
| *G06V 10/80* | (2022.01) |
| *G06V 10/82* | (2022.01) |

(52) U.S. Cl.
CPC ............... *G06V 10/96* (2022.01); *G06T 7/11* (2017.01); *G06V 10/764* (2022.01); *G06V 10/803* (2022.01); *G06V 10/82* (2022.01); *G06T 2207/20084* (2013.01)

(58) Field of Classification Search
CPC .... G06V 10/96; G06V 10/764; G06V 10/803; G06V 10/82; G06V 10/806; G06T 7/11; G06T 2207/20084
USPC ........................................................ 382/103
See application file for complete search history.

(56) References Cited

U.S. PATENT DOCUMENTS

| | | | |
|---|---|---|---|
| 2020/0151512 A1* | 5/2020 | Corral-Soto | .......... G06F 18/217 |
| 2020/0250437 A1* | 8/2020 | Rahimpour | .......... G05D 1/0214 |
| 2022/0188999 A1* | 6/2022 | Wang | ........................ G06T 5/50 |

(Continued)

FOREIGN PATENT DOCUMENTS

| | | | | |
|---|---|---|---|---|
| WO | WO-2023205631 A2 * | 10/2023 | ............. | A61B 1/041 |

*Primary Examiner* — Charlotte M Baker
(74) *Attorney, Agent, or Firm* — Greenberg Traurig

(57) ABSTRACT

A system for providing an enhanced vision transformer block for mobile vision transformers to perform computer vision tasks, such as image classification, segmentation, and objected detection is disclosed. A local representation block of the block applies a depthwise-separable convolutional layer to vectors of an input image to facilitate creation of local representation outputs associated with the image. The local representation output is fed into a global representation block, which unfolds the local representation outputs, applies vision transformers, and folds the result to generate a global representation output associated with the image. The global representation output is fed to a fusion block, which concatenates the local representations with the global representations, applies a point-wise convolution to the concatenation to generate a fusion block output, and fuses input features of the image with the fusion block out to generate an output to facilitate performance of a computer vision tasks.

20 Claims, 9 Drawing Sheets

310⤚

(56)                    References Cited

U.S. PATENT DOCUMENTS

| | | | |
|---|---|---|---|
| 2023/0073835 A1* | 3/2023 | Yin | G06V 10/776 |
| 2023/0290134 A1* | 9/2023 | Hu | G06V 10/7715 |
| 2023/0377724 A1* | 11/2023 | Vazquez Romaguera | |
| | | | G16H 20/40 |
| 2023/0394781 A1* | 12/2023 | Hatamizadeh | G06V 10/7715 |
| 2023/0401825 A1* | 12/2023 | Akkaya | G06N 3/045 |

* cited by examiner

Comparison with CNNs

Parameters (in Millions)

Top-1 Accuracy (%)

500

800

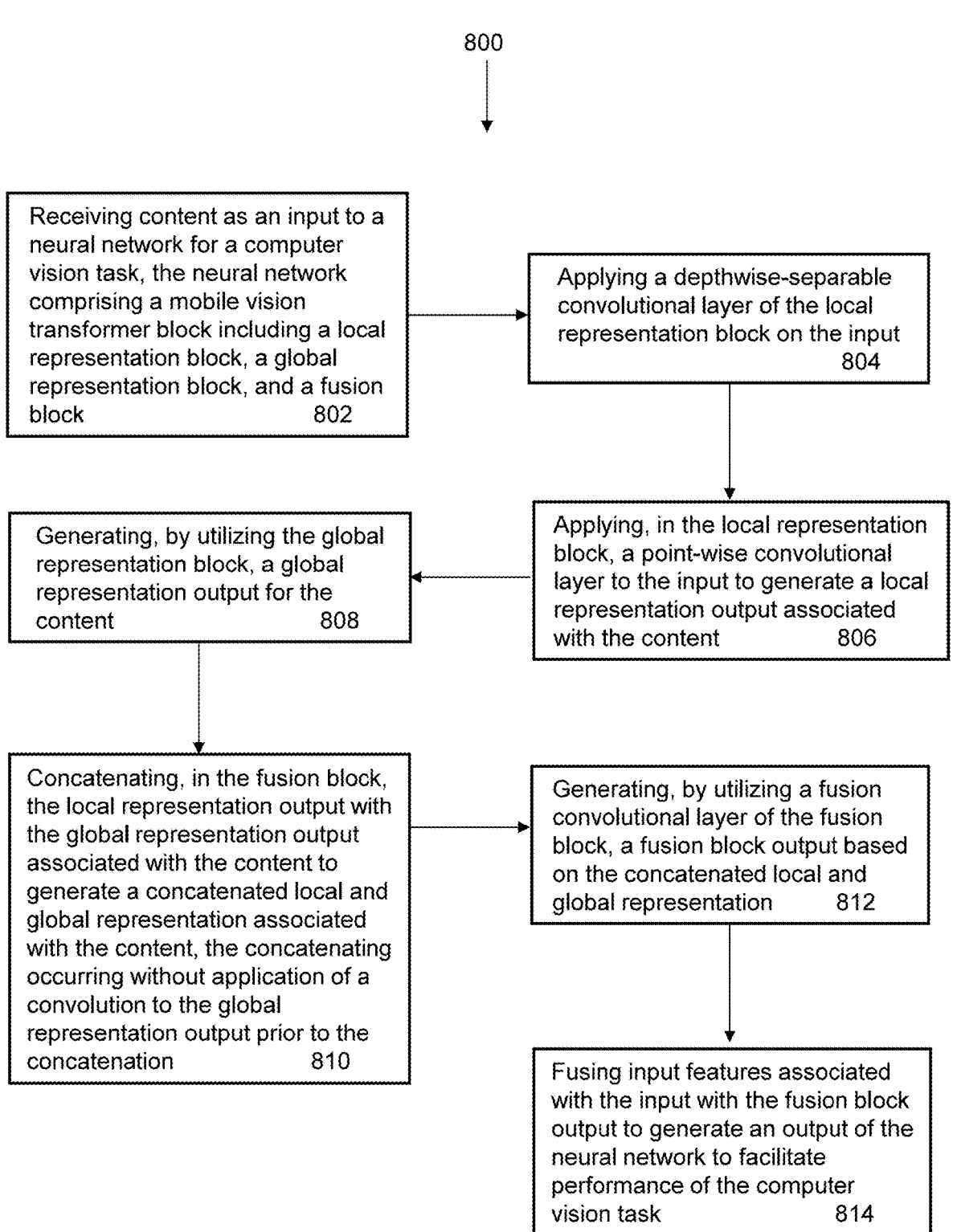

Receiving content as an input to a neural network for a computer vision task, the neural network comprising a mobile vision transformer block including a local representation block, a global representation block, and a fusion block          802

Applying a depthwise-separable convolutional layer of the local representation block on the input          804

Generating, by utilizing the global representation block, a global representation output for the content          808

Applying, in the local representation block, a point-wise convolutional layer to the input to generate a local representation output associated with the content          806

Concatenating, in the fusion block, the local representation output with the global representation output associated with the content to generate a concatenated local and global representation associated with the content, the concatenating occurring without application of a convolution to the global representation output prior to the concatenation          810

Generating, by utilizing a fusion convolutional layer of the fusion block, a fusion block output based on the concatenated local and global representation          812

Fusing input features associated with the input with the fusion block output to generate an output of the neural network to facilitate performance of the computer vision task          814

FIG. 8

SYSTEM FOR PROVIDING ENHANCED VISION TRANSFORMER BLOCKS FOR COMPUTER VISION

RELATED APPLICATIONS

The present application claims priority to and the benefit of Prov. U.S. Pat. App. Ser. No. 63/393,751, filed on Jul. 29, 2022, which is hereby incorporated by reference in the present disclosure in its entirety.

FIELD OF THE TECHNOLOGY

At least some embodiments disclosed herein relate to memory devices, neural networks, and vision transformers in general, and more particularly, but not limited to, a system for providing enhanced vision transformer blocks for computer vision.

BACKGROUND

In today's ever-increasing reliance on artificial intelligence to perform a variety of tasks and functions, the desire to innovate to provide even further functionality and capabilities has increased substantially. For example, computer vision is a field of artificial intelligence that involves utilizing computing systems and artificial intelligence algorithms to derive meaningful information from various forms of media content, such as, but not limited to, digital images, videos, and/or other visual content. The content may be obtained from a variety of different devices and systems, including, but not limited to, cameras, sensors, mobile devices, security systems, and autonomous vehicles. The information extracted from such content may be utilized by artificial intelligence and/or other systems to conduct actions, generate recommendations, and train artificial intelligence models to enhance computer vision capabilities. For example, computer vision may incorporate the use of deep learning, vision transformers, and/or convolutional neural networks to facilitate object detection within an environment, image classification to predict that content belongs to a particular class, object tracking to track an object upon detection, content-based image retrieval, among other computer vision tasks.

Light-weight convolutional neural networks have often been the default technology utilized for mobile vision tasks that may be conducted by mobile devices; however, convolutional neural networks are spatially local. As a result, in order to learn global representations, self-attention-based vision transformers have since been adopted for mobile vision tasks. Vision transformers generally operate by dividing an image into a sequence of non-overlapping patches and then learning inter-patch representations using self-attention. While vision transformers facilitate learning of global representations associated with content, visual transformers tend to be heavy in weight. As a result, existing vision transformer technologies may be enhanced to provide greater image classification, greater segmentation capabilities, and more effective object detection. Such enhancements would remove constraints on scalability and provide greater performance when performing computer vision-related tasks.

BRIEF DESCRIPTION OF THE DRAWINGS

The embodiments are illustrated by way of example and not limitation in the figures of the accompanying drawings in which like references indicate similar elements.

FIG. 8 shows an exemplary method for utilizing an enhanced mobile vision transformer block in a mobile vision transformer in accordance with embodiments of the present disclosure.

DETAILED DESCRIPTION

Figure 1:
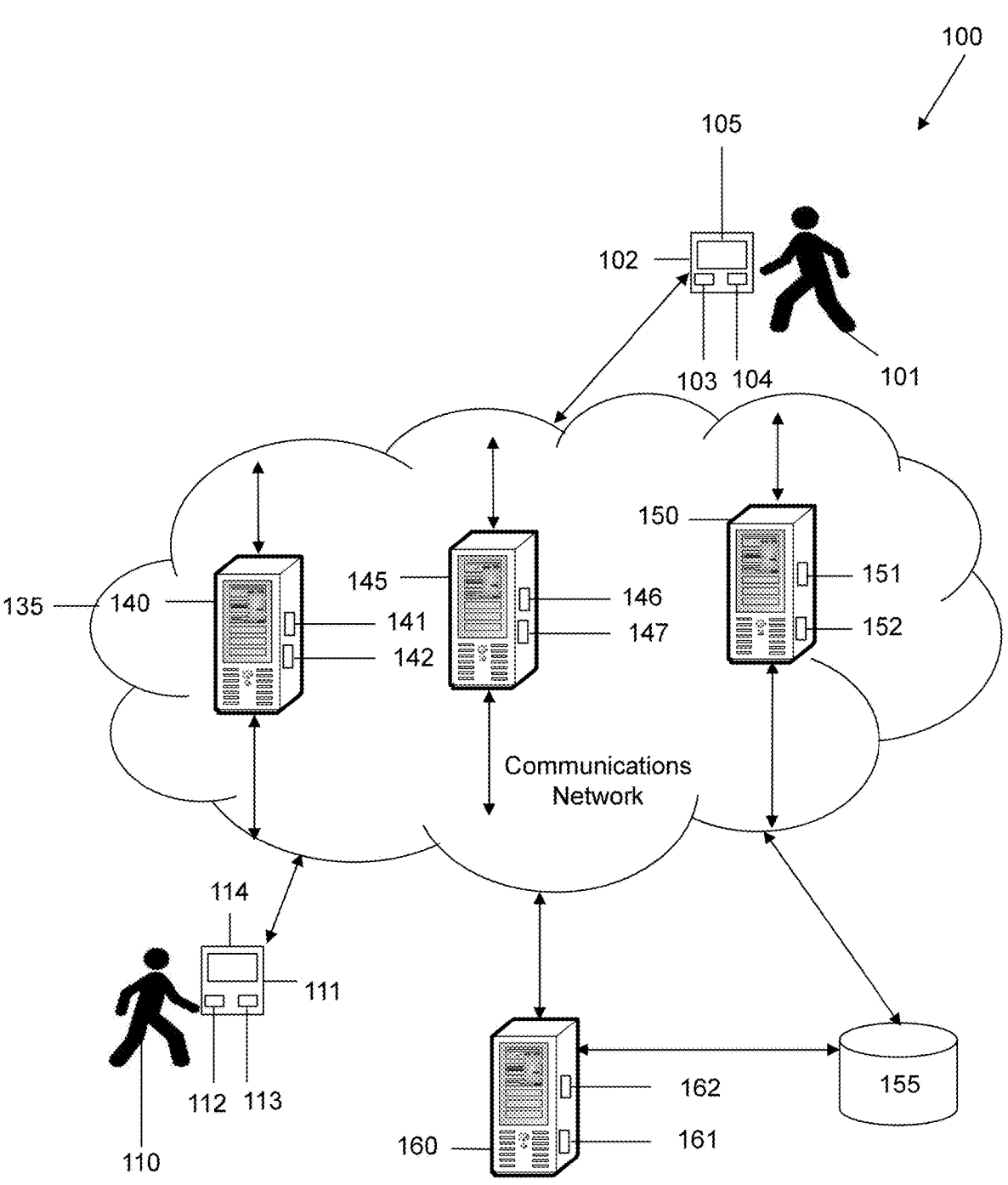
FIG. 1 illustrates an exemplary system for providing enhanced vision transformer blocks for computer vision accordance with embodiments of the present disclosure.

The following disclosure describes various embodiments for system and accompanying methods for providing an architecture that incorporates an enhanced vision transformer block for use with a mobile vision transformer to enhance the performance of computer vision-related tasks. In particular, embodiments provide an enhanced architecture for a mobile vision transformer block that may take advantage of the benefits of both convolutional neural networks (CNNs) and vision transformers (ViTs), particularly in the context of mobile devices utilizing neural networks to facilitate computer vision-related tasks, such as, but not limited to, image classification, object detection, image segmentation, content-based image retrieval, other computer-vision tasks, or a combination thereof. Image classification may involve utilizing a neural network to extract features from an image to classify the image as belonging to one of a set of predefined categories. For example, if a particular input image contains an image of a building, the neural network may extract feature from the input image and analyze the features using convolutional neural networks and/or vision transformers to classify the image at a high level as a building image. Object detection may involve utilizing a neural network to analyze an image to determine the location and the class for each object contained within an image. For example, if an image contains both a dog and a cat, the neural network may identify the location of the dog in the image and the location of the cat in the image. Image segmentation may involve utilizing a neural network to divide an image into different regions based on the characteristics of pixels to identify objects and/or boundaries to efficiently analyze the image. Image segmentation may be used to track objects in a sequence of images, for example.

Convolutional neural networks are deep learning neural network tools that may be configured to process structured arrays (e.g., pixel arrays), such as images, and typically incorporate the use any number of convolutional layers that detect patterns in an input image. For example, such patterns may include lines, circles, gradients, faces, noses, and/or other patterns. Each convolutional layer within the convolutional neural network can recognize more detailed and/or complex shapes and is utilized to mirror the structure of a human visual cortex, which includes its own series of layers that process an image in front of an eye and identify increasingly complex features. Each convolutional layer may include filters and/or kernels (e.g., matrices), which may be configured to slide over the input image to determine patterns within the image. If a certain part of the input image matches the pattern provided by the kernel, the kernel may return a large positive value, and, if the part does not match the pattern provided by the kernel, the kernel may return a zero or negative value. Convolutional layers, for example, may include vertical line detectors, horizontal line detectors, diagonal detectors, corner detectors, curve detectors, among other detectors. Such detectors, for example, may be trained on image data and may be utilized to identify whether a particular thing exists in an image. For example, the convolutional layers, using such detectors, can identify a dog within an image.

Vision transformers, on the other hand, are deep learning models that utilize mechanisms of attention, which differentially weight the significance of each part of the input data, such as an input image. Typically, vision transformers may include multiple self-attention layers to facilitate computer vision-related tasks. To that end, a vision transformer may represent an input image as a series of image patches, flatten the image patches, generate lower-dimensional embeddings from the flattened image patches, provide positional embeddings, provide the embeddings as an input to a transformer encoder, pre-train the vision transformer model with image labels, and then fine-tine the dataset to perform a computer vision task, such as image classification. The vision transformer encoder may identify local and global features that the image possesses. Notably, vision transformers may provide a higher precision rate on large datasets, while also having reduced model training time.

Currently, to combine the strengths of convolutional neural networks and vision transformers, mobile vision transformers, MobileViT and MobileViTv2, have been recently developed, which outperform convolutions neural networks and traditional vision transformers not only across different types of tasks, but also datasets. Typical convolutional neural networks involve conducting unfolding, local processing, and folding to facilitate computer vision tasks. For example, the MobileViT block in MobileViT (and MobileViTv2) replaces such local processing with global processing through the use of vision transformers. By doing so, the MobileViT and MobileViTV2 blocks have both convolutional neural network and vision transformer properties, which facilitate learning of better representations of an image with fewer parameters and straightforward training. While MobileViT and MobileViTv2 combine the properties of convolutional neural networks and vision transformers to achieve competitive and state of the art results, MobileViT has constraints on scaling up network size and MobileViTv2 also has scaling constraints.

At least some aspects of the present disclosure address the above and other deficiencies by providing an enhanced mobile vision transformer block for a mobile vision transformer that enhances performance of computer vision tasks. In certain embodiments, a computing system or device may be configured to receive content as an input to a neural network, such as for the performance of a computer vision task. In certain embodiments, the neural network may incorporate the use of CNNs, ViTs, deep learning models, and/or other artificial intelligence models to conduct the computer vision tasks. As indicated herein, computer vision tasks may include, but are not limited to, image classification (e.g., extracting features from image content and classifying and/or predicting the class of the image), object detection (e.g., identifying a certain class of image and then detect the presence of the image within image content), object tracking (e.g., tracking an object within an environment or media content once the object is detected), and content-based image retrieval (e.g., searching databases for content having similarity and/or correlation to content processed by the neural network), and/or other computer vision tasks.

In certain embodiments, the neural network may include a mobile vision transformer block that may include a local representation block, a global representation block, a fusion block, or a combination thereof. In certain embodiments, the mobile vision transformer block may be included within a series of blocks utilized by the neural network. For example, in certain embodiments, the series of blocks may include a convolutional block (e.g., a block that does 3×3 convolution with down-sampling $\downarrow 2$), a MobileNetv2 block, a MobileNetv2 block with down-sampling $\downarrow 2$, a MobileNetv2 block, a MobileNetv2 block with down-sampling $\downarrow 2$, an enhanced mobile vision transformer block, a MobileNetv2 block with down-sampling $\downarrow 2$, an enhanced mobile vision transformer block, a MobileNetv2 block with down-sampling $\downarrow 2$, an enhanced mobile vision transformer block, a convolutional block (e.g., a block that does 1×1 point-wise convolution), and/or a global pooling linear layer, which may provide the output of the series of blocks for the neural network.

In certain embodiments, the input to the neural network and/or the mobile vision transformer block (e.g. MobileViTv3 block provided by the present disclosure) may be obtained by a device, such as by a camera of a device. In certain embodiments, the received content may be passed through a filter to generate a feature map of the content. In certain embodiments, the feature map may be divided into image/content patches and may be converted into a vector that may be processed by the neural network. In certain embodiments, a context score map may be generated from the input content and may be used as well or in place of the feature map. In certain embodiments, the system may be configured to generate, by applying a depthwise-separable convolutional layer of the local representation block to the input image (e.g., may be applied to a feature map, tensors, and/or vectors generated from the input content) to generate a local representation output associated with the content. In certain embodiments, the local representation output may be generated by applying the depthwise-separable convolutional layer to the input image, and then applying a convolutional layer to the output of the depthwise-separable convolutional layer. In certain embodiments, the local representation output may be generated by applying the depthwise-separable convolutional layer (e.g., 3×3 depthwise-separable convolutional layer) to a tensor(s) or other input feature generated from the input and which may have parameters, such as H=height (e.g. in pixels), W=width (e.g., in pixels), and C=channel (e.g., red, green, blue for image or media content, such as images).

In certain embodiments, after applying the depthwise-separable convolutional layer, the convolutional layer may be applied, thereby producing $X_L \in R^{H \times W \times d}$ as the local representation output. In certain embodiments, the depthwise-separable convolutional layer may be configured to encode local spatial information from the image and the point-wise convolution (e.g., convolutional layer) may be utilized to project the tensor or other input feature to a high-dimensional space (or d-dimensional, where d>C). The system may be configured to generate, by utilizing the global representation block, a global representation output for the content. In certain embodiments, the local representation output for each portion of the feature map (or context score map) of the image may be fed as an input to the global representation block. The local representation outputs for the image may be unfolded using unfolding layer, which may unfold the local representation outputs into N non-overlapping flattened patches. For example, $X_L$ may be unfolded into N non-overlapping flattened patches $X_U \in R^{P \times N \times d}$. In certain embodiments, P=wh, N=(HW)/P is the number of patches, and h≤n and w≤n are height and width of a patch respectively. For each $p \in \{1, \ldots, P\}$, inter-patch relationships are encoded by applying transformers (e.g., linear transformers) to obtain $X_G \in R^{P \times N \times d}$ as: $X_G(p)$=Transformer($X_U(p)$), 1≤p≤P. The unfolded patches from the unfolding layer may be fed into the transformer to generate $X_G(p)$, which may then be fed into folding layer. The folding layer may fold $X_G \in R^{P \times N \times d}$ to obtain $X_F \in R^{H \times W \times d}$. The global representation output, which may serve as an input to the fusion block, may be generated based on the foregoing operations.

In certain embodiments, the system may then be configured to concatenate, in the fusion block, the local representation output(s) with the global representation output associated with the content to generate a concatenated local and global representation of the content. A reason for the use of local instead of input features is because the local representations are closer, more correlated, and/or more relevant to the global representations compared to the input features of the input image (or content). Also, the output channels of the local representation block may be slightly higher than input channels.

The system may be configured to utilize a fusion convolution layer of the fusion block, to generate a fusion block output based on the concatenated local and global representation. In certain embodiments, the concatenated local and global representation may be fused using a point-wise convolution (e.g., 1×1 convolution) to generate the fusion block output. The system may then be configured to fuse input features associated with the input (e.g., the same input fed initially into the local representation block) with the fusion block output to generate an output for the mobile vision transformer block, which may be utilized by processes and/or other blocks of the mobile vision transformer to perform a computer vision task. For example, the computer vision task may be image classification, image segmentation, object detection, content-based search, and/or other computer vision tasks.

As shown in FIG. 1 and referring also to FIGS. 2-7, a system 100 for providing an enhanced computer vision block (e.g., mobile vision transformer block) for use with a vision transformer (e.g., mobile vision transformer) to perform computer vision tasks is disclosed. Notably, the system 100 may be configured to support, but is not limited to supporting, data analytics systems and services, data collation and processing systems and services, artificial intelligence services and systems, machine learning services and systems, neural network services, vision transformer-based services, convolutional neural network (CNN)-based services, security systems and services, surveillance and monitoring systems and services, autonomous vehicle applications and services, mobile applications and services, alert systems and services, content delivery services, cloud computing services, satellite services, telephone services, voice-over-internet protocol services (VoIP), software as a service (SaaS) applications, platform as a service (PaaS) applications, gaming applications and services, social media applications and services, operations management applications and services, productivity applications and services, and/or any other computing applications and services. Notably, the system 100 may include a first user 101, who may utilize a first user device 102 to access data, content, and services, or to perform a variety of other tasks and functions. As an example, the first user 101 may utilize first user device 102 to transmit signals to access various online services and content, such as those available on an internet, on other devices, and/or on various computing systems. As another example, the first user device 102 may be utilized to access an application, devices, and/or components of the system 100 that provide any or all of the operative functions of the system 100. In certain embodiments, the first user 101 may be a person, a robot, a humanoid, a program, a computer, any type of user, or a combination thereof, that may be located in a particular environment. In certain embodiments, the first user 101 may be a person that may want to utilize the first user device to conduct computer vision tasks, such as, but not limited to, image classification, object detection, image segmentation, among other computer vision tasks. For example, the first user 101 may seek to identify objects existing within an environment and the first user 101 may take images and/or video content of the environment, which may be processed by utilizing neural networks accessible by the first user device 102.

The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102 and to interact with the system 100. In certain embodiments, the first user device 102 may be and/or may include a computer, any type of sensor, a laptop, a set-top-box, a tablet device, a phablet, a server, a mobile device, a smartphone, a smart watch, an autonomous vehicle, and/or any other type of computing device. Illustratively, the first user device 102 is shown as a smartphone device in FIG. 1. In certain embodiments, the first user device 102 may be utilized by the first user 101 to control and/or provide some or all of the operative functionality of the system 100.

In addition to using first user device 102, the first user 101 may also utilize and/or have access to additional user devices. As with first user device 102, the first user 101 may utilize the additional user devices to transmit signals to access various online services and content, record various content, and/or access functionality provided by one or more neural networks. The additional user devices may include memories that include instructions, and processors that executes the instructions from the memories to perform the various operations that are performed by the additional user devices. In certain embodiments, the processors of the additional user devices may be hardware, software, or a combination thereof. The additional user devices may also include interfaces that may enable the first user 101 to interact with various applications executing on the additional user devices and to interact with the system 100. In certain embodiments, the first user device 102 and/or the additional user devices may be and/or may include a computer, any type of sensor, a laptop, a set-top-box, a tablet device, a phablet, a server, a mobile device, a smartphone, a smart watch, an autonomous vehicle, and/or any other type of computing device, and/or any combination thereof. Sensors may include, but are not limited to, cameras, motion sensors, acoustic/audio sensors, pressure sensors, temperature sensors, light sensors, humidity sensors, any type of sensors, or a combination thereof.

The first user device 102 and/or additional user devices may belong to and/or form a communications network. In certain embodiments, the communications network may be a local, mesh, or other network that enables and/or facilitates various aspects of the functionality of the system 100. In certain embodiments, the communications network may be formed between the first user device 102 and additional user devices through the use of any type of wireless or other protocol and/or technology. For example, user devices may communicate with one another in the communications network by utilizing any protocol and/or wireless technology, satellite, fiber, or any combination thereof. Notably, the communications network may be configured to communicatively link with and/or communicate with any other network of the system 100 and/or outside the system 100.

In certain embodiments, the first user device 102 and additional user devices belonging to the communications network may share and exchange data with each other via the communications network. For example, the user devices may share information relating to the various components of the user devices, information associated with images and/or content accessed and/or recorded by a user of the user devices, information identifying the locations of the user devices, information indicating the types of sensors that are contained in and/or on the user devices, information identifying the applications being utilized on the user devices, information identifying how the user devices are being utilized by a user, information identifying user profiles for users of the user devices, information identifying device profiles for the user devices, information identifying the number of devices in the communications network, information identifying devices being added to or removed from the communications network, any other information, or any combination thereof.

In addition to the first user 101, the system 100 may also include a second user 110. The second user 110 may be similar to the first user 101, but may seek to do image classification, segmentation, and/or other computer vision-related tasks in a different environment and/or with a different user device, such as second user device 111. In certain embodiments, the second user device 111 may be utilized by the second user 110 to transmit signals to request various types of content, services, and data provided by and/or accessible by communications network 135 or any other network in the system 100. In further embodiments, the second user 110 may be a robot, a computer, a vehicle (e.g. semi or fully-automated vehicle), a humanoid, an animal, any type of user, or any combination thereof. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g. screen, monitor, graphical user interface, etc.) that may enable the first user 101 to interact with various applications executing on the second user device 111 and, in certain embodiments, to interact with the system 100. In certain embodiments, the second user device 111 may be a computer, a laptop, a set-top-box, a tablet device, a phablet, a server, a mobile device, a smartphone, a smart watch, an autonomous vehicle, and/or any other type of computing device. Illustratively, the second user device 111 is shown as a mobile device in FIG. 1. In certain embodiments, the second user device 111 may also include sensors, such as, but are not limited to, cameras, audio sensors, motion sensors, pressure sensors, temperature sensors, light sensors, humidity sensors, any type of sensors, or a combination thereof.

In certain embodiments, the first user device 102, the additional user devices, and/or the second user device 111 may have any number of software functions, applications and/or application services stored and/or accessible thereon. For example, the first user device 102, the additional user devices, and/or the second user device 111 may include applications for controlling and/or accessing the operative features and functionality of the system 100, applications for accessing and/or utilizing neural networks of the system 100, applications for controlling and/or accessing any device of the system 100, interactive social media applications, biometric applications, cloud-based applications, VoIP applications, other types of phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications may support the functionality provided by the system 100 and methods described in the present disclosure. In certain embodiments, the software applications and services may include one or more graphical user interfaces so as to enable the first and/or second users 101, 110 to readily interact with the software applications. The software applications and services may also be utilized by the first and/or second users 101, 110 to interact with any device in the system 100, any network in the system 100, or any combination thereof. In certain embodiments, the first user device 102, the additional user devices, and/or potentially the second user device 111 may include associated telephone numbers, device identities, or any other identifiers to uniquely identify the first user device 102, the additional user devices, and/or the second user device 111.

The system 100 may also include a communications network 135. The communications network 135 may be under the control of a service provider, the first user 101, any other designated user, a computer, another network, or a combination thereof. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry. The communications network 135 may also include and be connected to a neural network, a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, any network, or any combination thereof. Illustratively, servers 140, 145, and 150 are shown as being included within communications network 135. In certain embodiments, the communications network 135 may be part of a single autonomous system that is located in a particular geographic region, or be part of multiple autonomous systems that span several geographic regions.

Notably, the functionality of the system 100 may be supported and executed by using any combination of the servers 140, 145, 150, and 160. The servers 140, 145, and 150 may reside in communications network 135, however, in certain embodiments, the servers 140, 145, 150 may reside outside communications network 135. The servers 140, 145, and 150 may provide and serve as a server service that performs the various operations and functions provided by the system 100. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. Furthermore, the server 150 may include a memory 151 that includes instructions, and a processor 152 that executes the instructions from the memory 151 to perform the various operations that are performed by the server 150. In certain embodiments, the servers 140, 145, 150, and 160 may be network servers, routers, gateways, switches, media distribution hubs, signal transfer points, service control points, service switching points, firewalls, edge devices, nodes, computers, mobile devices, or any other suitable computing device, or any combination thereof. In certain embodiments, the servers 140, 145, 150 may be communicatively linked to the communications network 135, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or may be connected to a processor and memory to perform the various operation associated with the database 155. In certain embodiments, the database 155 may be connected to the servers 140, 145, 150, 160, the first user device 102, the second user device 111, the additional user devices, any devices in the system 100, any process of the system 100, any program of the system 100, any other device, any network, or any combination thereof.

The database 155 may also store information and metadata obtained from the system 100, store metadata and other information associated with the first and second users 101, 110, store artificial intelligence/neural network models utilized in the system 100, store sensor data and/or content obtained from an environment, store predictions made by the system 100 and/or artificial intelligence/neural network models, storing confidence scores relating to predictions made, store threshold values for confidence scores, responses outputted and/or facilitated by the system 100 and, store information associated with anything detected via the system 100, store information and/or content utilized to train the artificial intelligence/neural network models, store user profiles associated with the first and second users 101, 110, store device profiles associated with any device in the system 100, store communications traversing the system 100, store user preferences, store information associated with any device or signal in the system 100, store information relating to patterns of usage relating to the user devices 102, 111, store any information obtained from any of the networks in the system 100, store historical data associated with the first and second users 101, 110, store device characteristics, store information relating to any devices associated with the first and second users 101, 110, store information associated with the communications network 135, store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

The system 100 may include content acquisition and/or streaming devices, such as a camera, which may reside in the first user device 102 and/or second user device 111. The camera may be any type of camera including, but not limited to, a monitor camera, a DSLR camera, a film camera, an action camera, a motion-sensor-based camera, an infrared camera, a projection camera, a 360-degree camera, a mobile camera, any type of camera, or a combination thereof. The camera may be configured to capture video content, audio content, image content, any type of content, or a combination thereof. In certain embodiments, content frames associated with the content may be provided by the camera to componentry of the system 100 (e.g. processor 103) so that the content frames may be analyzed, processed, and/or modified and may be fed into artificial intelligence models/neural network models to conduct computer vision-related tasks. In certain embodiments, the content frames may include frames of video content, audio content, virtual reality content, augmented reality content, haptic content, audiovisual content, any type of content, or a combination thereof. Notably, the system 100 may include any number of cameras positioned at any suitable location with an environment, which may be utilized to monitor activity or anything occurring in the environment. The camera(s) may have a field of view, which may encompass any desired range for the specific monitoring situation. In certain embodiments, the camera(s) may have 360-degree views or other degree views. The system 100 may also include or reside within an environment, which may be any type of environment. For example, the environment may be a home, an airport, an environment around an autonomous vehicle a train station, a movie theater, a sports arena, an office building, a highway, a racetrack, a condominium, a hotel, a park, a forest, an ocean, a body of water, any type of environment, or a combination thereof.

The system 100 may include any number of sensors. The sensors may be any type of sensor that can measure sensor data occurring in and/or about an environment. In certain embodiments, the sensors may include, but are not limited to, cameras, pressure sensors, temperature sensors, acoustic sensors, humidity sensors, motion sensors, light sensors, chemical detection sensors, infrared sensors, thermal sensors, proximity sensors, position sensors, GPS sensors, any type of sensors, or a combination thereof. The sensors, for example, may be utilized to obtain information associated with the environment and/or people, animals, things, objects, and/or anything else existing on the environment. For example, motion sensors may be utilized to track the movements of a user, such as second user 110. Additionally, thermal/temperature sensors may be configured to detect the body temperature of the second user 110 and/or provide a thermal image of the second user 110, which may be utilized to facilitate image classification, segmentation, and/or object detection within an environment, such as by combining the sensor data with media content captured of the environment.

Figure 2:
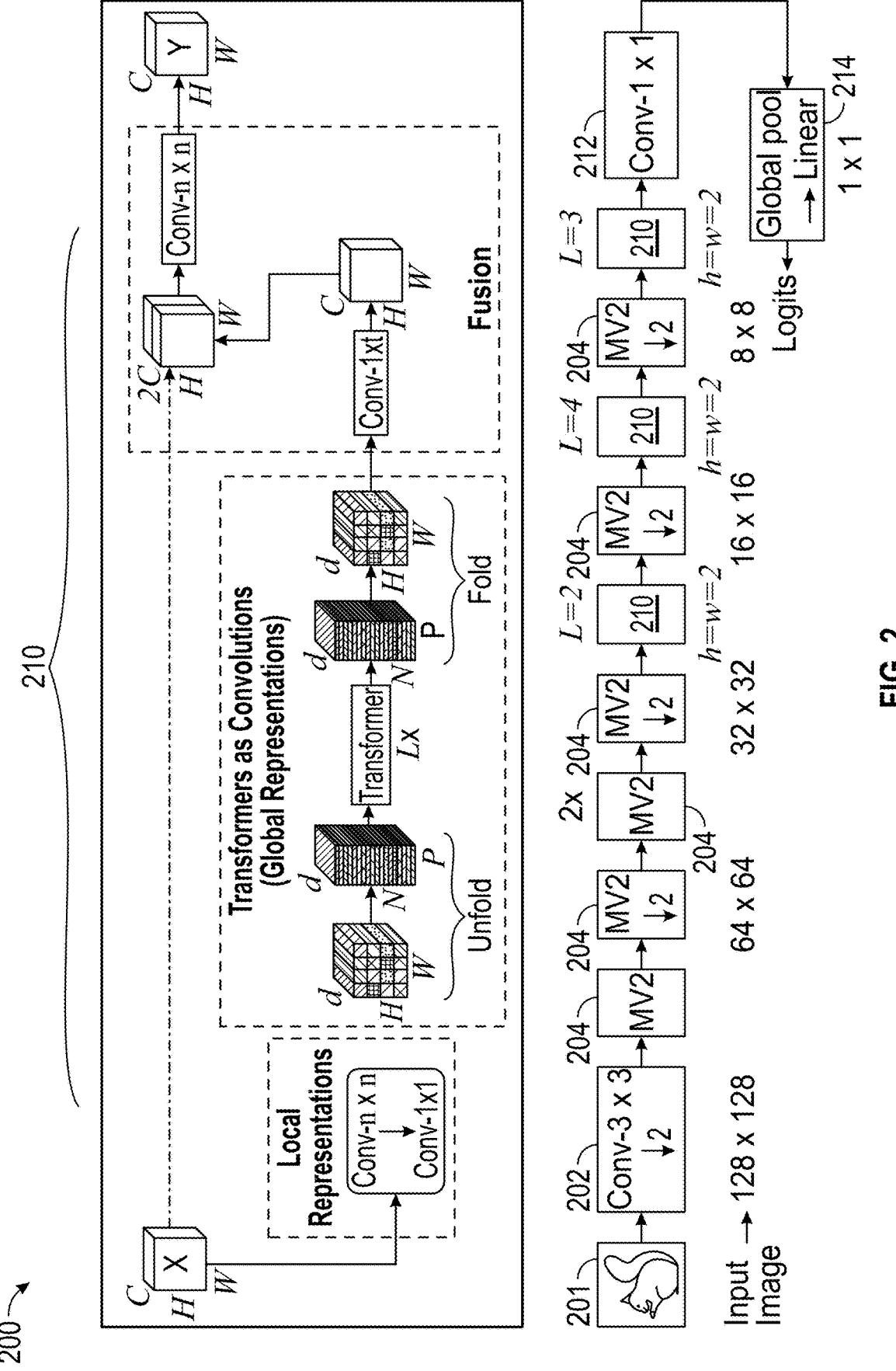
FIG. 2 shows an existing architecture for a mobile vision transformer.

Referring now also to FIG. 2, an exemplary mobile vision transformer 200 including mobile vision transformer blocks 210 may be included within a series of blocks utilized by the neural network. For example, in certain embodiments, the neural network may include an input 201 (which can be processed to output spatial dimensions of the image associated with the input 201), a convolutional block 202 (e.g., a block that does 3×3 convolution with down-sampling $\downarrow 2$), a MobileNetv2 block 204, a MobileNetv2 block 204 with down-sampling $\downarrow 2$, a MobileNetv2 block 204, a Mobile-Netv2 block 204 with down-sampling $\downarrow 2$, a MobileViT block 210, a MobileNetv2 block 204 with down-sampling $\downarrow 2$, a MobileViT block 210, a MobileNetv2 block 204 with down-sampling $\downarrow 2$, a MobileViT block 210, a convolutional block 212 (e.g., a block that does 1×1 point-wise convolution), and/or a global pooling linear layer 214, which may provide the output of the series of blocks for the neural network. The exemplary mobile vision transformer 200 may be utilized to conduct computer vision tasks, such as, but not limited to, image classification, image segmentation, object detection, and the like.

Figure 3:
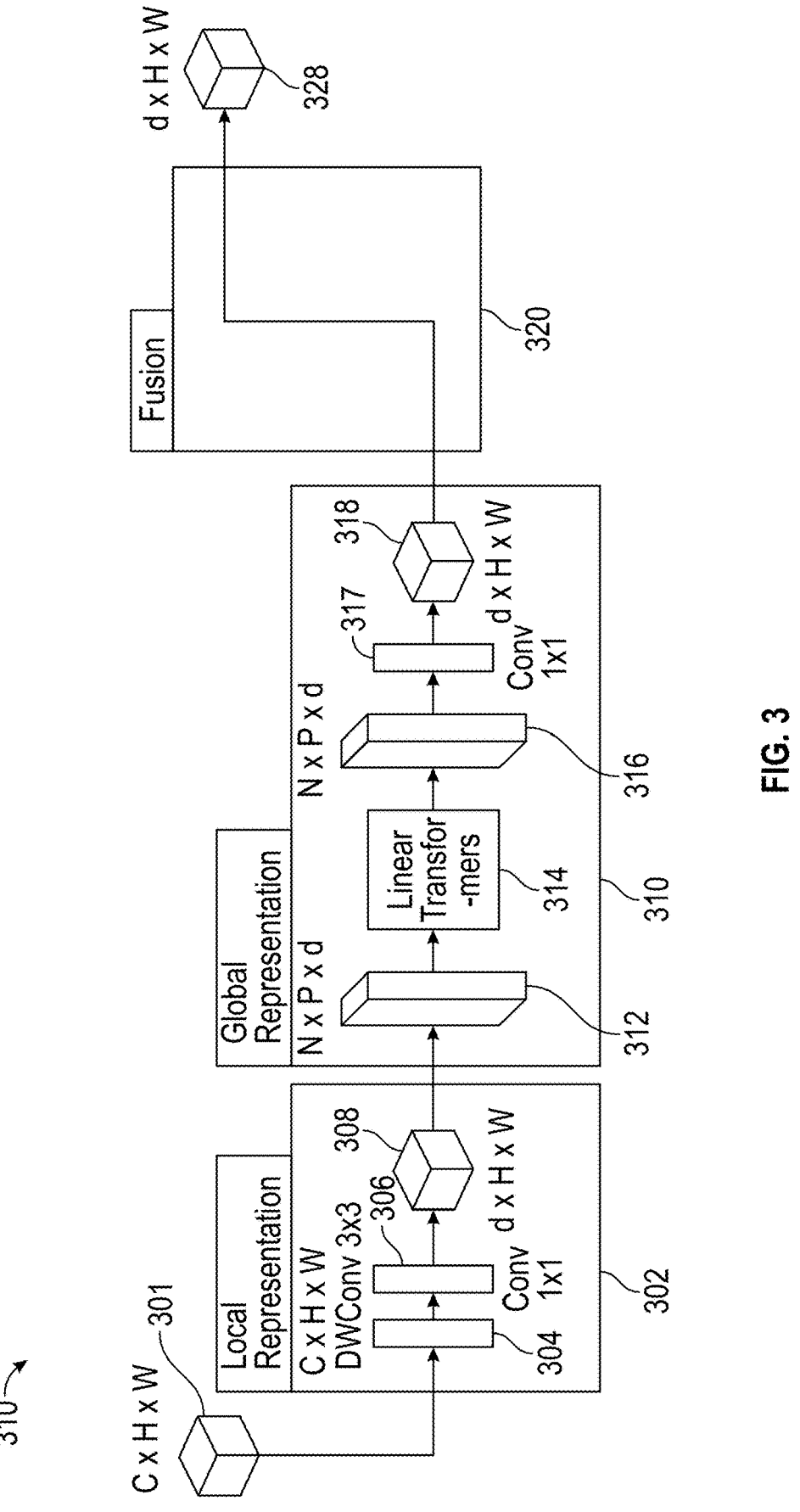
FIG. 3 illustrates detail relating to an existing mobile vision transformer block utilized in a mobile vision transformer.

Referring now also to FIG. 3, a mobile vision transformer block 310 is schematically shown. The mobile vision transformer block 310, shown in FIG. 3, models the local and global information in an input tensor 301 with parameters. For example, in a local representation block 302, for a given input $X \in R^{H \times W \times C}$, the mobile vision transformer block 210 applies a separable depthwise n×n convolutional layer 304 followed by a point-wise (or 1×1) convolutional layer 306 to produce $X_L \in R^{H \times W \times d}$ The n×n separable depthwise layer 304 computes context scores with respect to patches/tokens L of the input image, while the point-wise convolution 306 projects the input features to a high-dimensional space (or d-dimensional, where d>C) by learning linear combinations of the input channels. The context scores may be used to reweight input tokens/patches and produce a context vector, which may encode global information associated with the input image. The mobile vision transformer block 210 may learn global representations, and, as a result, $X_L$ 308 is unfolded (e.g., by using unfolding layer 312) into N non-overlapping flattened patches $X_U \in R^{P \times N \times d}$. P=wh, N=HW, P is the number of patches, and h≤n and w≤n are height and width of a patch respectively. For each p∈{1, . . . , P}, inter-patch relationships may be encoded by applying transformers 314 to obtain $X_G \in R^{P \times N \times d}$ as: $X_G(p)$=Transformer $(X_U(p))$, 1≤p≤P (1). Using the folding layer 316, $X_G \in R^{P \times N \times d}$ is folded and a convolution 317 (e.g., pointwise convolution (1×1 convolution)) is applied to obtain $X_F \in R^{H \times W \times d}$ which is the output 318 of the global representation block 310. The fusion block 320 may be bypassed and the output generated from the global representation block 310 may be the output 328 of the mobile vision transformer block 310, which may be utilized for a computer vision task.

Figure 4:
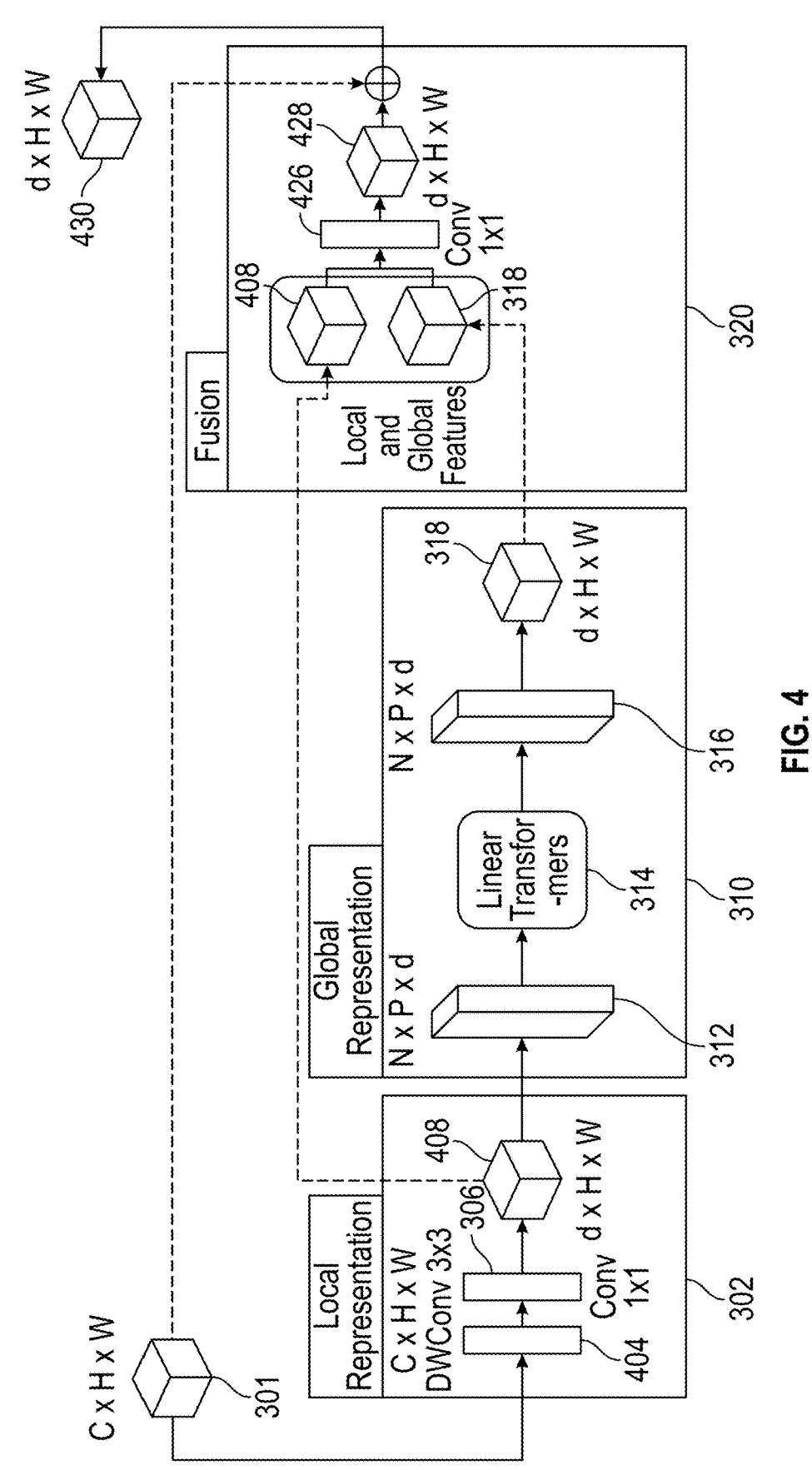
FIG. 4 illustrates an exemplary enhanced mobile vision transformer block for use with a mobile vision transformer according to embodiments of the present disclosure.

Referring now also to FIG. 4, an enhanced mobile vision transformer block 410 according to embodiments of the present disclosure is schematically illustrated. In certain embodiments, the mobile vision transformer block 410 may include a local representation block 302, a global representation block 310, a fusion block 320, or a combination thereof, such as provided in the mobile vision transformer block 210. In certain embodiments, the mobile vision transformer block 410 may be included within a series of blocks utilized by the neural network. For example, in certain embodiments, the series of blocks may include, a convolutional block 202 (e.g., a block that does 3×3 convolution with down-sampling $\downarrow 2$), a MobileNetv2 block 204, a MobileNetv2 block 204 with down-sampling $\downarrow 2$, a Mobile-Netv2 block 204, a MobileNetv2 block 204 with down-sampling $\downarrow 2$, an enhanced mobile vision transformer block 410, a MobileNetv2 block 204 with down-sampling $\downarrow 2$, an enhanced mobile vision transformer block 410, a Mobile-Netv2 block 204 with down-sampling $\downarrow 2$, an enhanced mobile vision transformer block 410, a convolutional block 212 (e.g., a block that does 1×1 point-wise convolution), and/or a global pooling linear layer 214, which may provide the output of the series of blocks for the neural network. In certain embodiments, the input 301 may be obtained by a device, such as by a camera or sensor of the first user device 102, which may capture images of an environment in which the first user 101 is located. In certain embodiments, the received content may be passed through a filter to generate a feature map of the content. In certain embodiments, the feature map may be divided into image/content patches and may be converted into a vector that may be processed by the neural network. In certain embodiments, a context score map may be generated from the input image(s), as discussed elsewhere in the present disclosure.

The mobile vision transformer block 410 may include a depthwise-separable convolutional layer 404 of the local representation block 302 that may be applied to the input image (e.g., may be applied to a feature map, context score map, tensors, and/or vectors generated from the input content) to generate a local representation output 408 associated with the content. The local representation output 408 may be generated by applying the depthwise-separable convolutional layer 404 to the input image, and then applying a convolutional layer 306 to the output of the depthwise-separable convolutional layer 404, as shown in FIG. 4. In certain embodiments, the local representation output 408 may be generated by applying the depthwise-separable convolutional layer 404 (e.g., 3×3 depthwise-separable convolutional layer) to a tensor(s) or other input feature generated from the input and which may have parameters, such as H=height (e.g. in pixels), W=width (e.g., in pixels), and C=channel (e.g., red, green, blue for image or media content, such as images).

In certain embodiments, the tensor(s) or other input features may be represented as vectors and/or matrices and may be represented by $X \in R^{H \times W \times C}$ The tensor(s) or other input features may comprise multidimensional arrays that may be data structures that may be represent visual data of any number of dimensions. After applying the depthwise-separable convolutional layer 404, the convolutional layer 306 may be applied, thereby producing $X_L \in R^{H \times W \times d}$ as the local representation output 408. In certain embodiments, the depthwise-separable convolutional layer 404 may be configured to encode local spatial information from the image and the point-wise convolution (e.g., convolutional layer 306) may be utilized to project the tensor to a high-dimensional space (or d-dimensional, where d>C).

The enhanced mobile vision transformer block 410 may be configure to generate, by utilizing the global representation block 310, a global representation output 318 for the content. In certain embodiments, the local representation output 408 for each portion of the feature map of the image (e.g., the image may be a 100×100 pixel image and each portion may be a 10×10 pixel portion of the entire image) or context score map may be utilized as an input to the global representation block 310. The local representation outputs 408 for the image may be unfolded using unfolding layer 312, which may unfold the local representation outputs 408 into N non-overlapping flattened patches. For example, $X_L$ may be unfolded into N non-overlapping flattened patches $X_U \in R^{P \times N \times d}$ In certain embodiments, P=wh, N=(HW)/P is the number of patches, and h≤n and w≤n are height and width of a patch respectively. For each p∈{1, . . . , P}, inter-patch relationships are encoded by applying transformers (e.g., linear transformers) to obtain $X_G \in R^{P \times N \times d}$ as: $X_G(p)$=Transformer($X_U(p)$), 1≤p≤P. The unfolded patches from the unfolding layer 312 may be fed into the transformer 314 to generate $X_G(p)$, which may then be fed into folding layer 316. The folding layer 316 may fold $X_G \in R^{P \times N \times d}$ to obtain $X_F \in R^{H \times W \times d}$. The global representation output 318, which may serve as an input to the fusion block 320, may be generated based on the foregoing operations.

The enhanced mobile vision transformer block 410 may facilitate concatenating, in the fusion block 320, the local representation output(s) 408 with the global representation output 318 associated with the content to generate a concatenated local and global representation of the content. In the fusion block 320, the local and global representations are concatenated in the enhanced mobile vision transformer block 410 instead of input features and global representation as utilized for the mobile vision transformer block 210. In certain embodiments, this is because the local representations are closer, more correlated, and/or more relevant to the global representations compared to the input features of the input 301. Also, the output channels of the local representation block 302 may be slightly higher than input channels.

The enhanced mobile vision transformer block 410 may facilitate generating, by utilizing a fusion convolution layer 426 of the fusion block 320, a fusion block output 428 based on the concatenated local and global representation. In certain embodiments, for example, the concatenated local and global representation may be fused using a point-wise convolution (e.g., 1×1 convolution 426, as shown in FIG. 4) to generate the fusion block output 428. A 1×1 convolutional layer 426 may be used in the fusion block 320 instead of the 3×3 convolutional layer 326, thereby allowing it to more clearly capture/fuse each location's input and global features and thereby making the corresponding mobile vision transformer scalable when compared with the existing technologies. The optimized mobile vision transformer block 410 and mobile vision transformer may include fusing input features associated with the input 301 (e.g., the same input fed initially into the local representation block 302) with the fusion block output 428 to generate an output 430 for the mobile vision transformer block 410, which may be utilized by processes and/or other blocks of the mobile vision transformer (e.g., mobile vision transformer 200) to complete a computer vision task. For example, the computer vision task may be image classification, image segmentation, object detection, content-based search, and the like.

In certain embodiments, the exemplary inventive computer-based systems/platforms, the exemplary inventive computer-based devices, and/or the exemplary inventive computer-based components of the present disclosure may be configured to utilize one or more exemplary artificial intelligence/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model, ii) Transfer the input data to the exemplary neural network model, iii) Train the exemplary model incrementally, iv) determine the accuracy for a specific number of timesteps, v) apply the exemplary trained model to process the newly-received input data, vi) optionally and in parallel, continue to train the exemplary trained model with a predetermined periodicity.

In certain embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving content as an input to a neural network for performance of a computer vision task (e.g., image classification, image segmentation, object detection, etc.); generating local representations associated with the content by applying convolutions to the content; generating global representations associated with the content (which may be based on processing the local representations of the content); concatenating local representations of the content with global representations of the content; generating a fusion block output by applying a convolution to the concatenated local and global representation; fusing input features of the content with the fusion block output to generate an output of the neural network utilized to facilitate performance of the computer vision task, and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIGS. 1-6 illustrates specific example configurations of the various components of the system 100, the system 100 may include any configuration of the components, which may include using a greater or lesser number of the components. For example, the system 100 is illustratively shown as including a first user device 102, a second user device 111, a communications network 135, a server 140, a server 145, a server 150, a server 160, and a database 155. However, the system 100 may include multiple first user devices 102, multiple second user devices 111, multiple communications networks 135, multiple servers 140, multiple servers 145, multiple servers 150, multiple servers 160, multiple databases 155, and/or any number of any of the other components inside or outside the system 100. Furthermore, in certain embodiments, substantial portions of the functionality and operations of the system 100 may be performed by other networks and systems that may be connected to system 100.

Referring now also to FIG. 8, FIG. 8 illustrates a method 800 for utilizing an enhanced mobile vision transformer block 410 in a mobile vision transformer according to embodiments of the present disclosure. For example, the method of FIG. 8 can be implemented in the system of FIG. 1 and/or any of the other systems illustrated in the Figures. In certain embodiments, the method of FIG. 8 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 8 may be performed at least in part by one or more processing devices (e.g., processor 104, processor 142, processor 147, processor 152, processor 162, and processor 113 of FIG. 1). Although shown in a particular sequence or order, unless otherwise specified, the order of the steps in the method 800 may be modified and/or changed depending on implementation and objectives. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 800 may include steps for utilizing an enhanced mobile vision transformer block 410 in a neural network to enhance performance of computer vision tasks. In certain embodiments, the method 800 may be performed by utilizing system 100, system 900, and/or by utilizing any combination of the componentry contained therein. At step 802, the method 800 may include receiving content as an input (e.g., input having input features X) to a neural network, such as for the performance of a computer vision task. In certain embodiments, the neural network may employ the use of CNNs, ViTs, deep learning models, and/or other artificial intelligence models to conduct the computer vision tasks. Such computer vision tasks may include, but are not limited to, image classification (e.g., extracting features from image content and classifying and/or predicting the class of the image), object detection (e.g., identifying a certain class of image and then detect the presence of the image within image content), object tracking (e.g., tracking an object within an environment or media content once the object is detected), and content-based image retrieval (e.g., searching databases for content having similarity and/or correlation to content processed by the neural network), among other computer vision tasks.

In certain embodiments, the neural network may include a mobile vision transformer block 410 that may include a local representation block 302, a global representation block 310, a fusion block 320, or a combination thereof. In certain embodiments, the mobile vision transformer block 410 may be included within a series of blocks utilized by the neural network. For example, in certain embodiments, the series of blocks may include, a convolutional block 202 (e.g., a block that does 3×3 convolution with down-sampling ↓2), a MobileNetv2 block 204, a MobileNetv2 block 204 with down-sampling ↓2, a MobileNetv2 block 204, a Mobile-Netv2 block 204 with down-sampling ↓2, an enhanced mobile vision transformer block 410, a MobileNetv2 block 204 with down-sampling ↓2, an enhanced mobile vision transformer block 410, a MobileNetv2 block 204 with down-sampling ↓2, an enhanced mobile vision transformer block 410, a convolutional block 212 (e.g., a block that does 1×1 point-wise convolution), and/or a global pooling linear layer, which may provide the output of the series of blocks for the neural network. In certain embodiments, the input may be obtained by a device, such as by a sensor or camera of the first user device 102, which may capture images or other content of an environment in which the first user 101 is located. In certain embodiments, the received content may be passed through a filter and/or kernel to generate a feature map and/or context score map associated with the content. In certain embodiments, the feature map may be divided into image/content patches and may be converted into a vector that may be processed by the neural network.

At step 804, the method 800 may include generating, by applying a depthwise-separable convolutional layer 404 of the local representation block 302 to the input image (e.g., may be applied to a feature map, tensors, and/or vectors generated from the input content) to generate a local representation output 408 associated with the content. In certain embodiments, the depthwise-separable convolutional layer 404 may be configured to compute context scores (e.g., by mapping a d-dimensional input feature in X to a scalar by using a linear layer with weights, computing a k-dimensional vector, and applying an operation to the k-dimensional vector to compute the context scores) and may be configured to provide for separable self-attention. The scores may then be utilized to reweight the features and produce a context vector, which may be utilized to encode global information associated with the input content. The local representation output 408 may be generated by applying the depthwise-separable convolutional layer 404 to the input image, and then applying a convolutional layer 306 (e.g., point-wise 1×1 convolutional layer) to the output of the depthwise-separable convolutional layer 404, as shown in FIG. 4 and step 806 of FIG. 8. In certain embodiments, the local representation output 408 may be generated by applying the depthwise-separable convolutional layer 404 (e.g., 3×3 depthwise-separable convolutional layer) to a tensor(s), vector, or other feature generated from the input and which may have parameters, such as H=height (e.g. in pixels), W=width (e.g., in pixels), and C=channel (e.g., red, green, blue for image or media content, such as images). In certain embodiments, to further reduce parameters, the normal 3×3 convolutional layer 304 in local the representation block 302 may be replaced with the depthwise-separable 3×3 convolutional layer 404.

In certain embodiments, the tensor(s) may be represented as vectors and/or matrices and may be represented by $X \in R^{H \times W \times C}$. The tensor(s) may comprise multidimensional arrays that may be data structures that may be represent visual data of any number of dimensions. After applying the depthwise-separable convolutional layer 404, the convolutional layer 306 may be applied, thereby producing $X_L \in R^{d \times H \times W}$ as the local representation output 408. In certain embodiments, the depthwise-separable convolutional layer 404 may be configured to encode local spatial information from the image and the point-wise convolution (e.g., convolutional layer 306) may be utilized to project the tensor to a high-dimensional space (or d-dimensional, where d>C). Step 806 of the method 800 may include applying, in the local representation block 302, the point-wise convolutional layer 306 (e.g., 1×1 convolution) to the input to generate the local representation output 408 associated with the content.

At step 808, the method 800 may include generating, by utilizing the global representation block 310, a global representation output 318 for the content. In certain embodiments, the local representation output 408 for each portion of the feature map/context score map of the image (e.g., the image may be a 100×100 pixel image and each portion may be a 10×10 pixel portion of the entire image) may be utilized as an input to the global representation block 310. The local representation outputs 408 for the image may be unfolded using unfolding layer 312, which may unfold the local representation outputs 408 into N non-overlapping flattened patches. For example, $X_L$ may be unfolded into N non-overlapping flattened patches $X_U \in R^{P \times N \times d}$. In certain embodiments, P=wh, N=(HW)/P is the number of patches, and h≤n and w≤n are height and width of a patch respectively. For each $p \in \{1, \ldots, P\}$, inter-patch relationships are encoded by applying transformers (e.g., linear transformers) to obtain $X_G \in R^{P \times N \times d}$ as: $X_G(p) = \text{Transformer}(X_U(p))$, 1≤p≤P. The unfolded patches from the unfolding layer 312 may be fed into the transformer 314 to generate $X_G(p)$, which may then be fed into folding layer 316. The folding layer 316 may fold $X_G \in R^{P \times N \times d}$ to obtain $X_F \in R^{H \times W \times d}$. The global representation output 318, which may serve as an input to the fusion block 320, may be generated based on the foregoing operations.

At step 810, the method 800 may include concatenating, in the fusion block 320, the local representation output(s) 408 with the global representation output 318 associated with the content to generate a concatenated local and global representation of the content. In the fusion block 320, the local and global representations are concatenated in the optimized mobile vision transformer block 410. In certain embodiments, this is because the local representations are closer, more correlated, and/or more relevant to the global representations compared to the input features of the input 301. Also, the output channels of the local representation block 302 may be slightly higher than input channels. In certain embodiments, the concatenating may be performed without application of a convolution in the fusion block 320 to the global representation output 318 prior to the concatenation.

At step 812, the method may include generating, by utilizing a fusion convolution layer 426 of the fusion block 320, a fusion block output 428 based on the concatenated local and global representation. In certain embodiments, for example, the concatenated local and global representation may be fused using a point-wise convolution (e.g., 1×1 convolution 426, as shown in FIG. 4) to generate the fusion block output 428. In certain embodiments, there may be two primary motivations behind replacing the 3×3 convolutional layer 326 in the fusion block 320 of FIG. 3 with the 1×1 convolutional layer 426 in fusion block 320 of FIG. 4. A first motivation is to remove one of the major constraints in scaling of the architecture shown in FIG. 3. Scaling the mobile vision transformer 210 may be done by changing width of the neural network and keeping the depth constant. Changing width/number of output channels of the mobile vision transformer block 210 may cause a large increase in the number of parameters and MAdds mainly due to the 3×3 convolutional layer 326 in fusion block 320 of the mobile vision transformer block 210, as shown in FIG. 3. For example, if the input and output channels doubled (2×) for the mobile vision transformer block 210, as shown in FIG. 3, the number of input channels to the 3×3 convolutional layer 326 is increased by 4× and output channels are increased by 2×. As a result, this causes a large increase in parameters and MAdds of the mobile vision transformer block 210. In the mobile vision transformer block 210, the input to the 3×3 convolutional layer 326 is the concatenation of input and global representation block features, therefore it increases by 4× instead of 2×. A second motivation comprises fusing local and global features independent of other location in feature map and simplifying the fusion layer's task. A 3×3 convolutional layer on an abstract level fuses three things, I. input features, II. global features and III. Other location's input & global features which are present in the receptive field, which is complex. When fusing input & global features for each location, a 3×3 kernel makes each location's feature dependent on other location's input & global features in the receptive field. A 1×1 convolutional layer 426 may be used in the fusion block 320 instead of the 3×3 convolutional layer 326, thereby allowing it to more clearly capture/fuse each location's input and global features and thereby making the mobile vision transformer according to the present disclosure scalable when compared with existing technologies.

At step 814, the method 800 may include fusing input features associated with the input 301 (e.g., the same input fed initially into the local representation block 302) with the fusion block output 428 to generate an output 430 for the mobile vision transformer block 410, which may be utilized by processes and/or other blocks of the mobile vision transformer (e.g., mobile vision transformer 200) to complete a computer vision task. For example, the computer vision task may be image classification, image segmentation, object detection, content-based search, and the like. In certain embodiments, the method 800 may be repeated as new inputs are received by the mobile vision transformer 200 and/or by the system 100 and/or 900. Notably, the method 800 may incorporate any of the other functionality as described herein and may be adapted to support the functionality of the systems 100 and 900.

Figure 5:
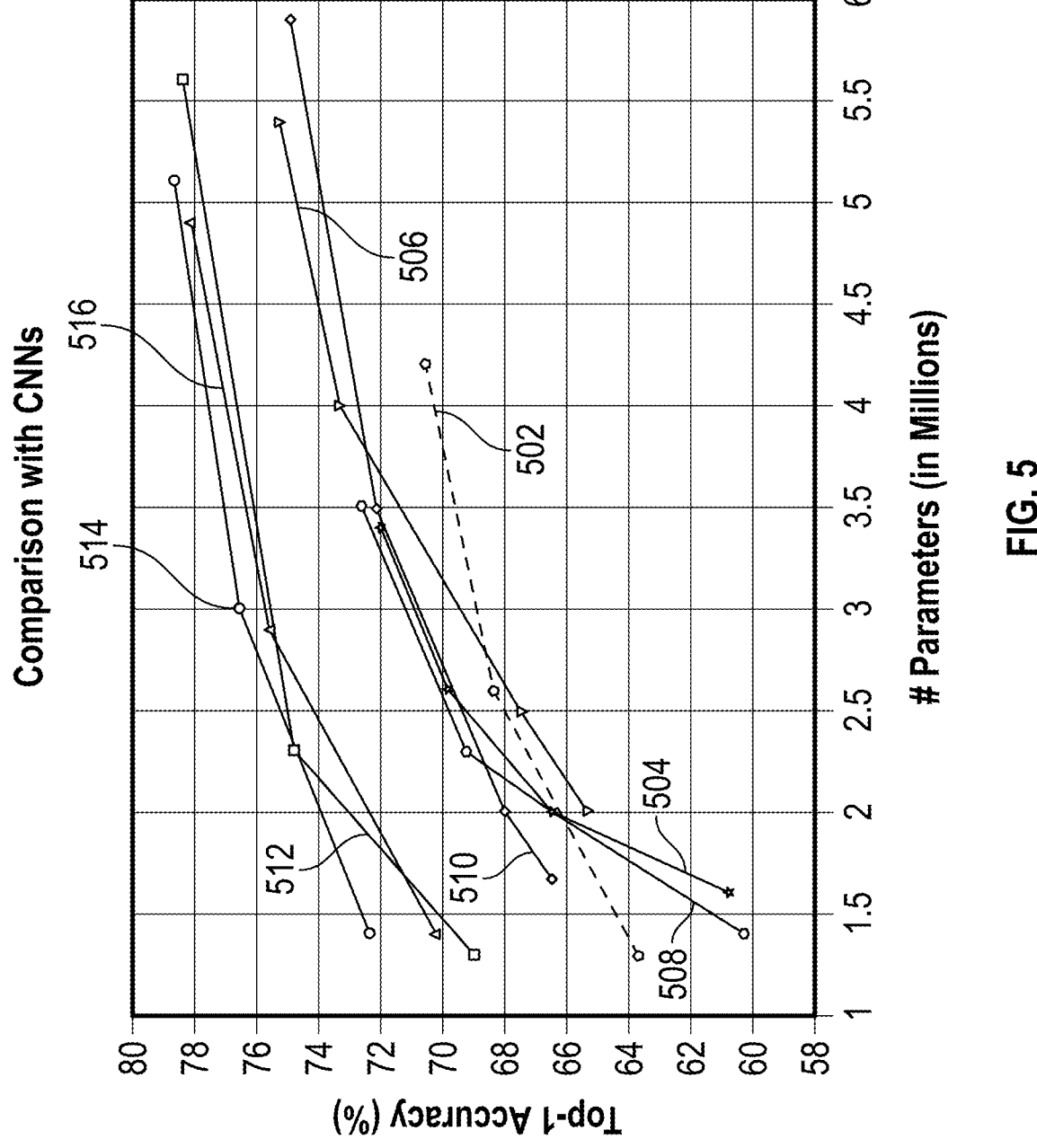
FIG. 5 illustrates a graph depicting a comparison of the performance of the exemplary enhanced mobile vision transformer block of FIG. 4 with the performance of various convolutional neural networks.

Exemplary experimental results relating to the optimized mobile vision transformer are also provided herein. Comparison with CNNs: FIG. 5 shows graph 500 showing that the enhanced mobile vision transformer 410 (514 in FIG. 5) of the present disclosure outperforms light-weight CNNs across different network sizes MobileNetv1 502, Mobile-Netv2 504, ShuffleNetv2 508, ESPNetv2 510, MobileNetv3 506 Mobile ViT 512, MobileViTV2 516.

Figure 6:
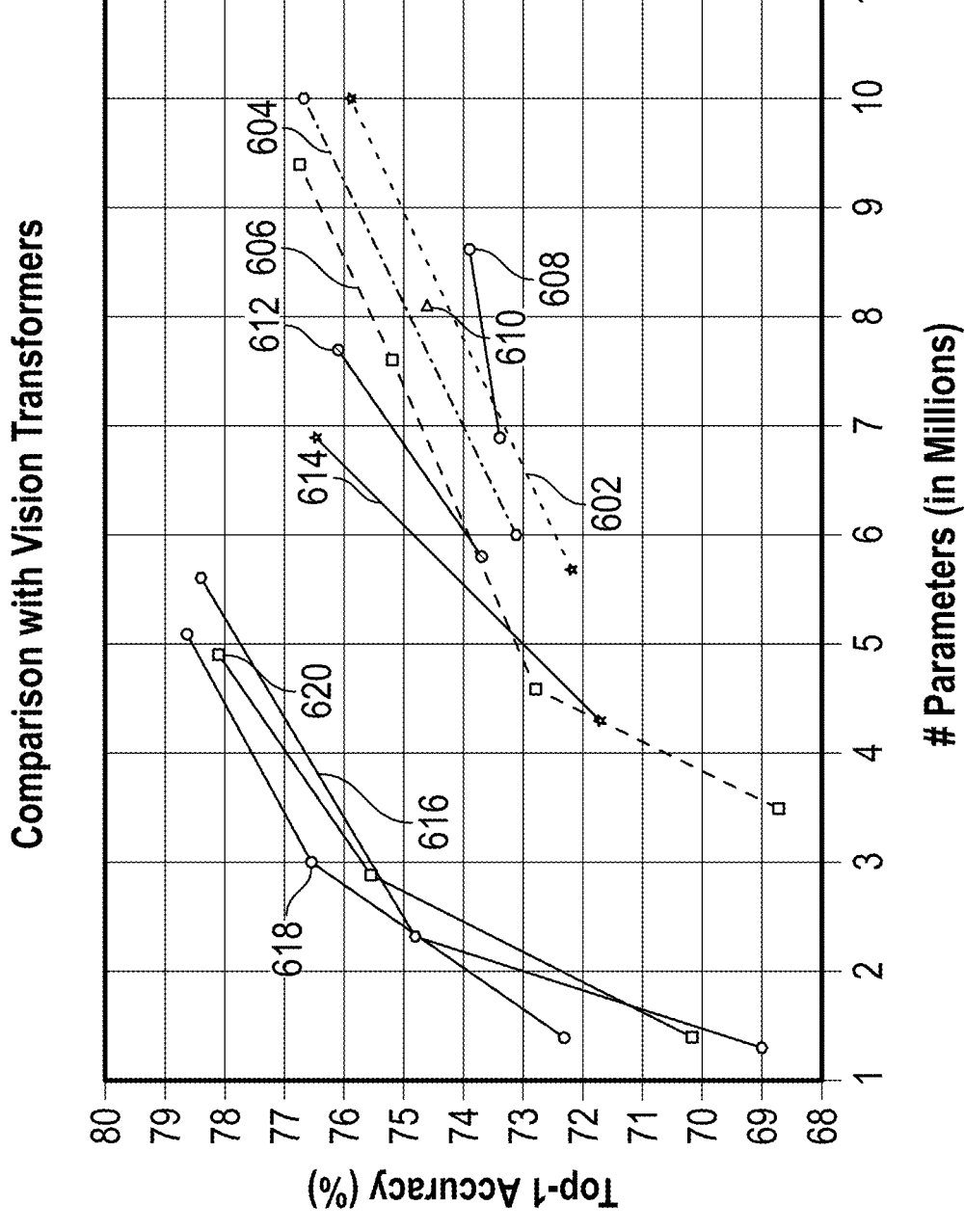
FIG. 6 illustrates a graph depicting a comparison of the performance of the exemplary enhanced mobile vision transformer block of FIG. 4 with the performance of various vision transformers.

Comparison with vision transformers: FIG. 6 shows graph 600, which compares the enhanced mobile vision transformer (618 in FIG. 6) of the present disclosure with vision transformer variants that are trained from scratch on an ImageNet-1k dataset (DeIT 602, ConViT 604, T2T 614, Mobile-former 606, CrossViT 608, DeepViT 610, LocalViT 612, MobileViT 616, MobileViTv2 620). Enhanced mobile vision transformer 618 has better performance than the aforementioned transformers.

Figure 7:
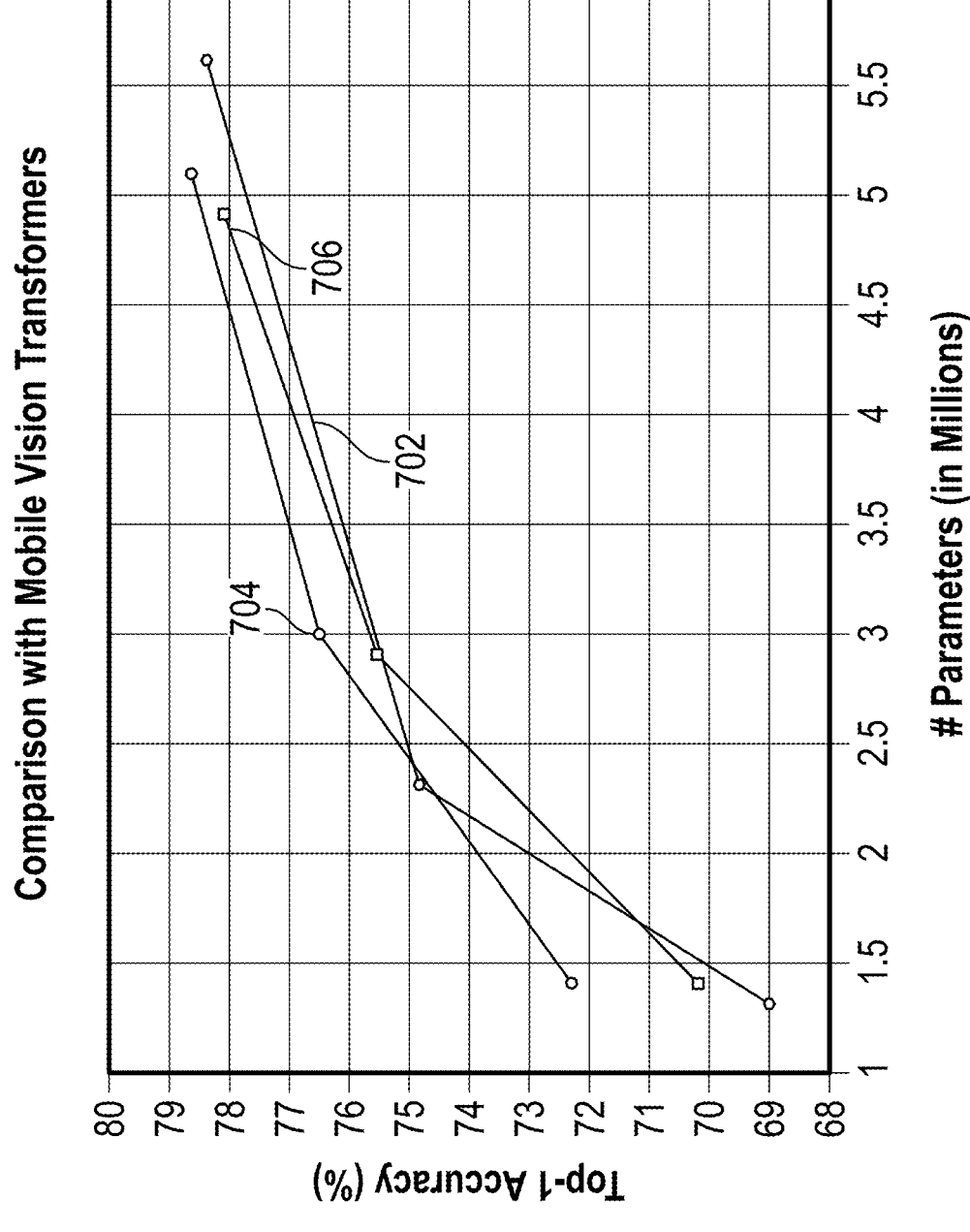
FIG. 7 illustrates a graph depicting a comparison of the performance of the exemplary enhanced mobile vision transformer block of FIG. 4 with the performance of various mobile vision transformers.

Comparison with mobile vision transformers: FIG. 7 shows graph 700, which shows superior performance for the enhanced mobile vision transformer 704 of the present disclosure when compared to MobileViT 702 and Mobi-leViTv2 706.

Figure 9:
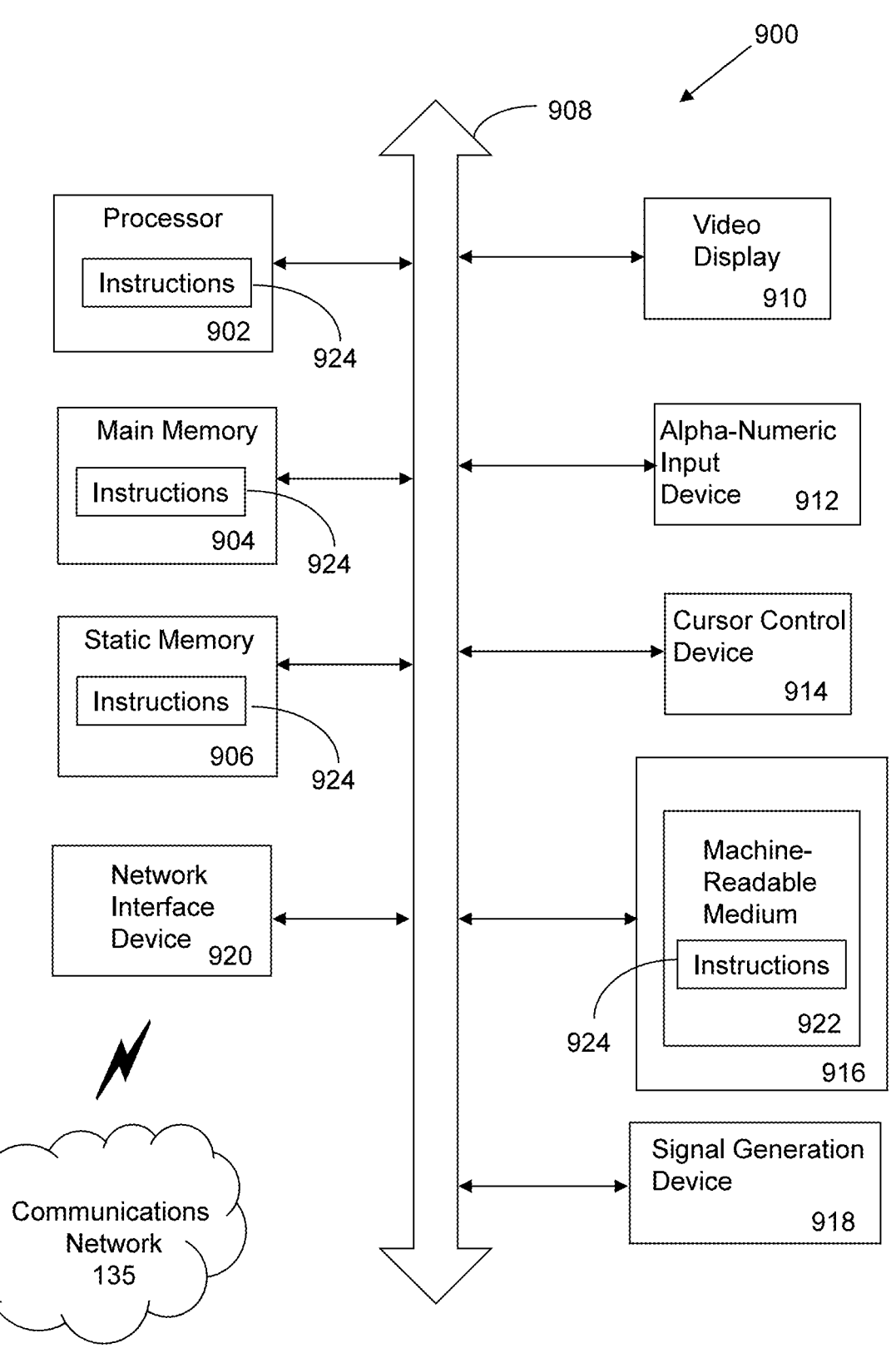
FIG. 9 illustrates a schematic diagram of a machine in the form of a computer system within which a set of instructions, when executed, may cause the machine to facilitate mobile vision transformer functionality incorporating the enhanced mobile vision transformer block according to embodiments of the present disclosure.

Referring now also to FIG. 9, at least a portion of the methodologies and techniques described with respect to the exemplary embodiments of the system 100 and/or method 800 can incorporate a machine, such as, but not limited to, computer system 900, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100. As another example, in certain embodiments, the computer system 900 may assist with receiving content as an input to a neural network for performance of a computer vision task (e.g., image classification, image segmentation, object detection, etc.), generating local representations associated with the content by applying convolutions to the content, generating global representations associated with the content, concatenating local representations with global representations, generating a fusion block output by applying a convolution to the concatenated local and global representation, fusing input features for the content with the fusion block output to generate an output of the neural network utilized to facilitate performance of the computer vision task, and/or performing any other operations of the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the server 140, the server 145, the server 150, the database 155, the server 160, any other system, program, and/or device, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910, which may be, but is not limited to, a liquid crystal display (LCD), a flat panel, a solid-state display, or a cathode ray tube (CRT). The computer system 900 may include an input device 912, such as, but not limited to, a keyboard, a cursor control device 914, such as, but not limited to, a mouse, a disk drive unit 916, a signal generation device 918, such as, but not limited to, a speaker or remote control, and a network interface device 920.

The disk drive unit 916 may include a machine-readable medium 922 on which is stored one or more sets of instructions 924, such as, but not limited to, software embodying any one or more of the methodologies or functions described herein, including those methods illustrated above. The instructions 924 may also reside, completely or at least partially, within the main memory 904, the static memory 906, or within the processor 902, or a combination thereof, during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 922 containing instructions 924 so that a device connected to the communications network 135, another network, or a combination thereof, can send or receive voice, video or data, and communicate over the communications network 135, another network, or a combination thereof, using the instructions. The instructions 924 may further be transmitted or received over the communications network 135, another network, or a combination thereof, via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (nonvolatile) memories, random access memories, or other rewritable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A system, comprising:
a memory; and
a processor;
wherein the processor is configured to receive content as an input to a neural network for a computer vision task, wherein the neural network comprises a local representation block, a global representation block, and a fusion block;
wherein the processor is configured to concatenate, in the fusion block, a local representation output with a global representation output associated with the content to generate a concatenated local and global representation of the content;
wherein the processor is configured to generate, by utilizing a fusion convolutional layer of the fusion block, a fusion block output based on the concatenated local and global representation; and
wherein the processor is configured to generate an output of the neural network to facilitate the computer vision task.

2. The system of claim 1, wherein the processor is further configured to concatenate, in the fusion block, the local representation output with the global representation output without application of a convolution to the global representation output prior to the concatenation.

3. The system of claim 1, wherein the processor is further configured to, by utilizing an unfolding layer, facilitate generation of the global representation output based on an unfolded local representation output generated from the local representation output.

4. The system of claim 3, wherein the processor is further configured to apply a linear transformer to the unfolded local representation output during generation of the global representation output.

5. The system of claim 4, wherein the processor is further configured to apply a folding layer after application of the linear transformer to generate the global representation output.

6. The system of claim 1, wherein the processor is configured to apply down-sampling to the output of the neural network.

7. The system of claim 1, wherein the processor is further configured to classify an image associated with the content based on the output of the neural network.

8. The system of claim 1, wherein the processor is further configured to detect an object within the content based on the output of the neural network.

9. The system of claim 1, wherein the processor is further configured to conduct image segmentation for the content based on the output of the neural network.

10. The system of claim 1, wherein the processor is further to generate the output of the neural network based on summation of input features of the input to the fusion block output.

11. The system of claim 1, wherein the content of the input comprises video content, augmented reality content, virtual reality content, image content, or a combination thereof.

12. The system of claim 1, wherein the processor is further configured to convert the input into a vector.

13. A method, comprising:

receiving, by a processor of a computing device associated with a neural network, content as an input to a neural network for a computer vision task, wherein the neural network comprises a local representation block, a global representation block, and a fusion block;

concatenating, in the fusion block and by the processor of the computing device, a local representation output with a global representation output associated with the content to generate a concatenated local and global representation of the content;

generating, by utilizing a fusion convolutional layer of the fusion block and by utilizing the processor of the computing device, a fusion block output based on the concatenated local and global representation; and fusing, by the processor of the computing device, input features associated with the input with the fusion block output to generate an output of the neural network to facilitate the computer vision task.

14. The method of claim 13, further comprising concatenating, in the fusion block and by the processor, the local representation output with the global representation output without application of a convolution to the global representation output prior to the concatenation.

15. The method of claim 13, further comprising identifying an object within the content based on the output of the neural network.

16. The method of claim 13, further comprising generating a prediction that the content belongs to a class based on the output of the neural network.

17. The method of claim 13, further comprising facilitating performance of a different computer vision task by utilizing a mobile vision transformer block comprising the local representation block, the global representation block, and the fusion block.

18. A device, comprising:

a memory; and a processor;

wherein the processor is configured to receive content as an input to a neural network for a computer vision task, wherein the neural network comprises a fusion block;

wherein the processor is configured to concatenate, in the fusion block, a local representation output with a global representation output associated with the content to generate a concatenated local and global representation of the content;

wherein the processor is configured to generate, by utilizing a fusion convolutional layer of the fusion block, a fusion block output based on the concatenated local and global representation; and wherein the processor is configured to fuse input features associated with the input with the fusion block output to generate an output of the neural network to facilitate the computer vision task.

19. The device of claim 18, wherein the processor is further configured to project the input features to a high-dimensional space based on application of a point-wise convolutional layer to the input after applying a depthwise-separable convolutional layer on the input.

20. The device of claim 18, wherein the processor is further configured to generate the global representation using a linear transformer.

*   *   *   *   *